US008671749B2

(12) United States Patent
Zeineddine

(10) Patent No.: US 8,671,749 B2
(45) Date of Patent: Mar. 18, 2014

(54) SYSTEM AND METHOD TO PROTECT STRAIN GAUGES WHILE TRANSMITTING PRESSURE

(75) Inventor: Firas Zeineddine, Bristol (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 346 days.

(21) Appl. No.: 13/168,992

(22) Filed: Jun. 26, 2011

(65) Prior Publication Data
US 2012/0325010 A1    Dec. 27, 2012

(51) Int. Cl.
*E21B 47/06* (2012.01)
*E21B 44/00* (2006.01)
*E21B 47/00* (2012.01)

(52) U.S. Cl.
USPC .................. 73/152.51; 73/152.46; 73/152.48; 73/152.43

(58) Field of Classification Search
USPC ............... 73/152.03, 152.16, 152.19, 152.02, 73/152.18, 715, 152.43, 152.46, 152.51, 73/152.48; 702/6, 9, 12
See application file for complete search history.

(56) References Cited

U.S. PATENT DOCUMENTS

| | | | | |
|---|---|---|---|---|
| 7,814,782 B2 * | 10/2010 | DiFoggio | .................. | 73/152.19 |
| 2005/0000279 A1 * | 1/2005 | Yogeswaren | .............. | 73/152.58 |
| 2012/0198939 A1 * | 8/2012 | Brown et al. | .................. | 73/715 |

* cited by examiner

*Primary Examiner* — Lisa Caputo
*Assistant Examiner* — Jonathan Dunlap
(74) *Attorney, Agent, or Firm* — Chadwick A. Sullivan; Brigitte Echols

(57) ABSTRACT

A technique facilitates drilling of boreholes by enabling improved measurement of strain during drilling applications. A strain gauge is mounted on a drilling component of a drill string. The strain gauge is covered with a volume of liquid, and the liquid is enclosed at least in part with a flexible layer of material. The flexible layer of material is sufficiently flexible to provide a negligible pressure differential between the volume of liquid and the surrounding environment while drilling, thus enabling accurate functioning of the strain gauge.

16 Claims, 4 Drawing Sheets

SYSTEM AND METHOD TO PROTECT STRAIN GAUGES WHILE TRANSMITTING PRESSURE

BACKGROUND

Strain gauges are used in a wide variety of applications to measure strains experienced in a given component. For example, strain gauges have been connected to drilling components to monitor strains experienced by the drilling system during wellbore drilling applications. The strains may be due to pressure within the drilling system, e.g. due to pressure of the drilling mud delivered along the drilling system. In certain drilling applications, strain gauges have been mounted in a volume of oil, however the design of existing oil volume systems can create detrimental effects with respect to maintaining accuracy of the strain gauges.

In some systems utilizing oil to surround the strain gauge, attempts have been made to compensate for oil volume changes under pressure. However, existing systems do not enhance the measurement accuracy of the strain gages. For example, some designs employ spring-loaded, oil compensation pistons in which a spring-loaded piston is designed to move in a manner which compensates for oil volume changes. When the piston moves, however, the spring force acting on the piston creates a differential pressure in the volume of oil which causes the strain gauges to measure strain caused by pressure which is different than the actual the pressure of interest, e.g. the pressure of drilling mud flowing along the drilling system.

SUMMARY

In general, the present invention provides a system and method for measuring strain in a drilling application. A strain gauge is mounted on a drilling component of a drill string. The strain gauge is covered with a volume of protective liquid, e.g. oil, and the volume of protective liquid is enclosed with a flexible layer of material. The flexible layer of material is sufficiently flexible to provide a negligible pressure differential between the volume of protective liquid and the surrounding environment while drilling, thus enabling accurate functioning of the strain gauge.

BRIEF DESCRIPTION OF THE DRAWINGS

Certain embodiments of the invention will hereafter be described with reference to the accompanying drawings, wherein like reference numerals denote like elements, and.

DETAILED DESCRIPTION

In the following description, numerous details are set forth to provide an understanding of the present invention. However, it will be understood by those of ordinary skill in the art that the present invention may be practiced without these details and that numerous variations or modifications from the described embodiments may be possible.

The present invention generally relates to a system and methodology to facilitate accurate measurement of strain in a variety of applications, such as wellbore drilling applications. According to one embodiment, the system and methodology protect strain gauges from environmental drilling conditions while allowing the hydraulic pressure acting on the drilling system to be accurately transmitted to the strain gauges. The system is designed to compensate for volume changes in the protective liquid, e.g. oil, surrounding the strain gauge while eliminating undesirable pressure differentials or at least keeping the undesirable pressure differentials to a minimum. Minimizing the pressure differential between the volume of protective liquid and the surrounding environment enhances the quality of the measurements taken by the strain gauges during, for example, drilling applications.

According to one embodiment, a strain gauge is protected by a compensation system enclosing the strain gauge. The compensation system comprises a cap mounted to a component subjected to strain, e.g. a drilling component. Beneath the cap, a strain gauge (or strain gages) is mounted to the component in a cavity filled with a volume of oil. The compensation system further comprises a flexible layer of material disposed within the cap and enclosing the volume of oil. The flexible layer of material is designed to compensate for oil volume changes without creating a detrimental pressure differential between the volume of oil and the external environment. In drilling applications, the external environment may comprise flowing drilling mud under pressure.

The flexible layer of material may be formed from a variety of material types and have various constructions designed to provide the desired functionality. For example, the flexible layer of material is designed to move sufficiently to compensate for oil volume changes with very little resistance force, thus keeping pressure acting on an inner side and on an outer side of the flexible layer the same or nearly the same. By way of example, the flexible layer may comprise a resilient sheet, such as a rubber sheet. Additionally, the flexible layer may comprise a wavy sheet or a bellows.

Figure 1:
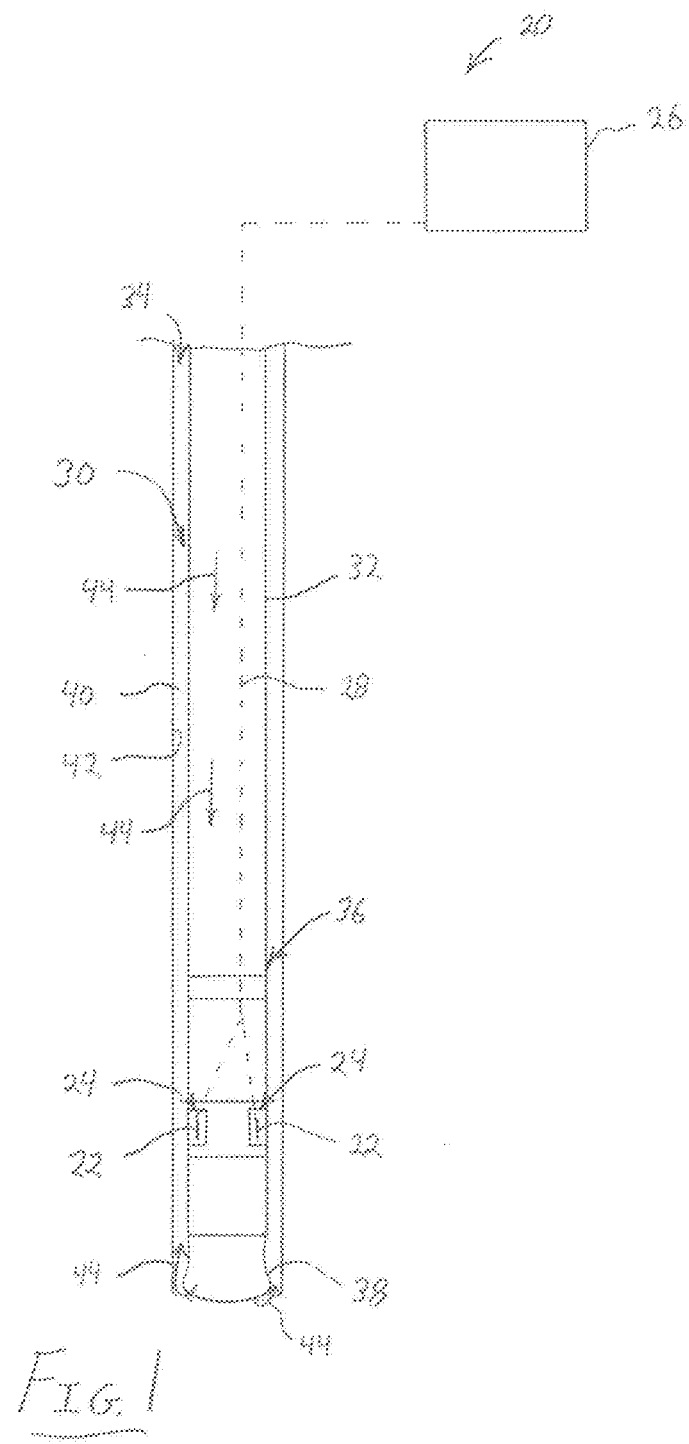
FIG. 1 is a schematic illustration of a drilling system used to drill a wellbore wherein the drilling system incorporates strain gauges, according to an embodiment of the present invention.

Many types of tools may be combined with one or more of the strain gauges and compensation systems described herein to protect the strain gauge while improving the accuracy of measurement. Referring generally to FIG. 1, for example, an embodiment of a well system 20 is illustrated as incorporating a strain gauge 22 and a strain gauge compensation system 24. In this particular example, a plurality of strain gauges 22 and corresponding compensation systems 24 are employed to provide data to a data collection and processing system 26, e.g. a control system. The data may be transmitted from the strain gauges 22 to the data system 26 via one or more communication lines 28, such as wired or wireless communication lines.

Well system 20 may have a variety of forms, but one embodiment comprises a drilling system 30 having a drill string 32 deployed in a wellbore 34. In some applications, the drill string comprises a drilling assembly 36 for controlling a drill bit 38. The drilling assembly 36 may include many types of components depending on the specific design of the drilling assembly. For example, the drilling assembly 36 may comprise a rotary steerable system or other drilling system designed to rotate and/or steer the drill bit 38 so as to form a desired wellbore 34.

Generally, a drilling fluid, e.g. drilling mud, is pumped down through an interior of the drill string 32, through drill bit 38, and then up through an annulus 40 between the drill string 32 and the surrounding wellbore wall 42. The flowing drilling fluid or drilling fluid flow path is represented by arrows 44 in FIG. 1. The drilling fluid is pumped down through drill string 32 under pressure, and the effects of the pressure and/or other aspects of the drilling operation may be measured by one or more of the strain gauges 22. Accordingly, strain gauges 22 may be located along drilling assembly 36, as illustrated, or they may be located at other components of the drill string 32, e.g. within the drill bit or drill string joints.

Figure 2:
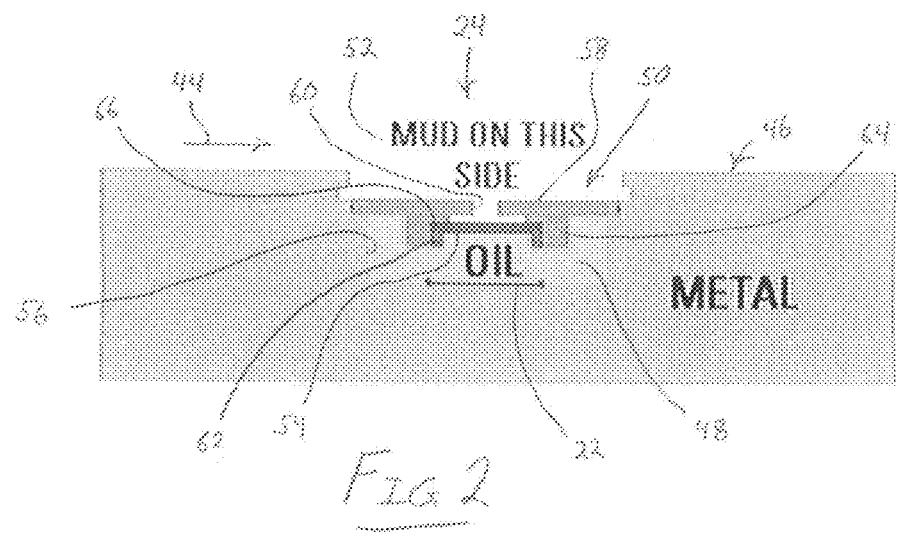
FIG. 2 is an illustration of an example of a strain gauge and a strain gauge compensation system, according to an embodiment of the present invention.

Referring to FIG. 2, an embodiment of strain gauge compensation system 24 is illustrated. In this embodiment, the strain gauge 22 is mounted to a component 46, such as a metal component forming part of the drilling assembly 36. The strain gauge 22 is enclosed by compensation system 24 which includes a volume of protective liquid 48. Protective liquid 48 may be in the form of an oil or another suitable liquid to protect the strain gauge 22. The protective liquid/oil 48 is contained over strain gauge 22 by a compensation assembly 50 which encloses the liquid 48. The compensation assembly 50 is part of compensation system 24 and serves to compensate for volume changes of the protective liquid/oil 48 with very little force, thus maintaining the internal pressure within the liquid 48 the same or nearly the same as the environmental pressure external to compensation assembly 50. If, for example, the strain gauge 22 and compensation system 24 are placed along the flowing drilling fluid within drilling assembly 36, the pressure within the volume of liquid 48 is the same or nearly the same as the pressure of the drilling fluid flowing along an exterior 52 of compensation assembly 50.

In the embodiment illustrated, the compensation assembly 50 comprises a flexible material 54, e.g. a resilient, flexible layer of material, which is positioned between the volume of liquid 48 and the external environment 52. The flexible layer of material 54 is designed to easily flex to enable compensation for volume changes of liquid 48 while exerting minimal force. The minimal force is insufficient to detrimentally affect the pressure differential between the liquid 48 and the exterior 52.

In the specific example illustrated, strain gauge 22 is positioned in a cavity 56 formed in component 46 and the cavity 56 is filled or at least partially filled with the protective liquid/oil 48. The flexible layer of material 54 is formed as a sheet which encloses the volume of liquid 48 and is held in place by a cap 58 having an aperture 60 which exposes the flexible material 54 to the pressures associated with the external environment 52, e.g. pressures associated with drilling fluid flowing through drilling assembly 36. The flexible layer of material 54 may be secured between the cap 58 and a retention ring 62. In this embodiment, the flexible material 54, cap 58, and retention ring 62 are components of compensation assembly 50.

The cap 58 may comprise a circular flange 64 sized to threadably receive or otherwise securely receive retention ring 62 such that the retention ring 62 squeezes an outer or perimeter region 66 of the flexible material 54 against an undersurface of the cap 58. However, other configurations of cap 58 and retention ring 62 may be combined to secure the flexible material 54. It should be noted that cavity 56 may be formed in component 46, attached to component 46, or otherwise formed in a manner to contain the strain gauge 22 and liquid 48.

Figure 3:
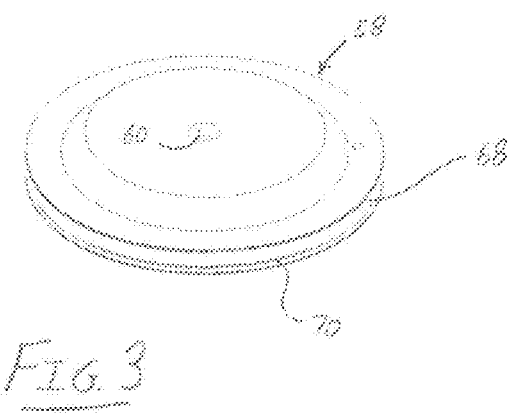
FIG. 3 is an orthogonal view of a portion of the strain gauge compensation system, according to an embodiment of the present invention.

In FIG. 3, an example of cap 58 is illustrated. In this example, cap 58 is generally circular and aperture 60 is formed as a circular opening through a central region of the cap 58. The cap 58 also may comprise a sidewall 68 which may be designed to receive or otherwise to seal against an appropriate seal member 70. The seal 70 is positioned to form a fluid tight seal between the sidewall 68 and a surrounding surface of component 46.

Figure 4:
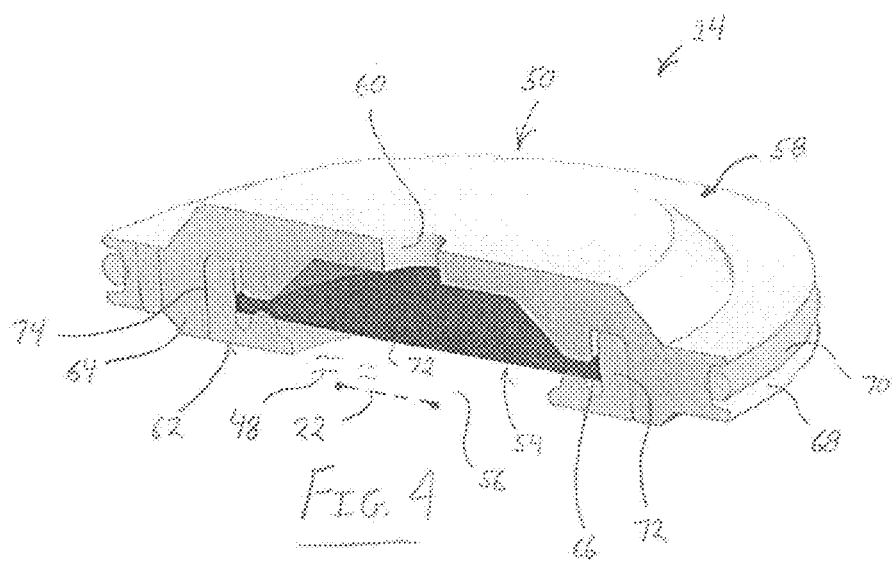
FIG. 4 is a cutaway view of an example of the strain gauge compensation system in which a flexible layer of material is positioned to at least partially enclose a volume of protective liquid and to accommodate changes in volume without creating a detrimental pressure differential between the volume of protective liquid and the surrounding environment, according to an embodiment of the present invention.

An orthogonal, cross-sectional view of the circular embodiment of cap 58 is illustrated in FIG. 4 as containing the flexible layer of material 54. In this embodiment, the flexible layer of material 54 is formed generally as a sheet 72 which may be made from various flexible materials, such as elastomeric materials and composite materials. According to one example, the flexible layer of material 54 is formed from a rubber material. In this embodiment, one or more strain gauges 22 may be installed under cap 58 in a suitable oil.

Figure 5:
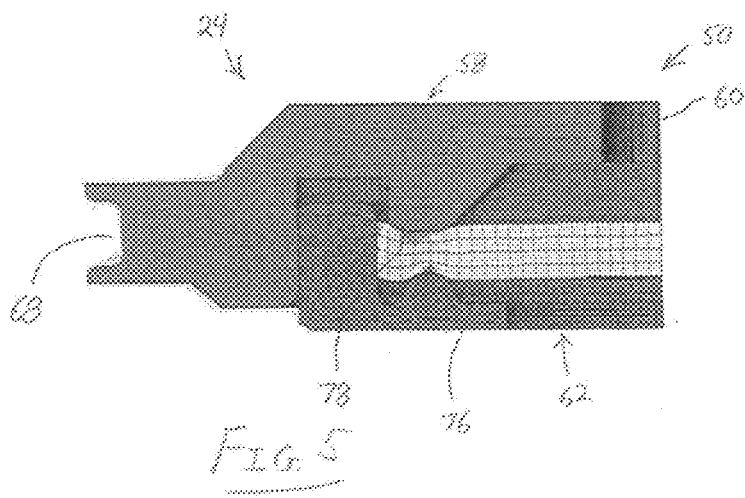
FIG. 5 is a schematic representation of a portion of the flexible layer of material squeezed between a cap and a ring to form a seal, according to an embodiment of the present invention.

In the example of FIG. 4, the flexible material 54 is secured beneath cap 58 by retention ring 62. The illustrated retention ring 62 comprises an engagement portion designed to engage the cap 58 along an interior surface of circular flange 64. The engagement portion 72 and circular flange 64 may be coupled together by a suitable fastening mechanism 74, such as a threaded region. The flexible material 54 contains the oil 48 while allowing changes in volume of oil 48 without creating detrimental pressure differentials on opposing sides of the flexible material. However, the flexible material 54 also may perform the function of forming a seal between the oil/protective fluid 48 and the flowing drilling fluid 44. As further illustrated in FIG. 5, the retention ring 62 may be designed to compress the perimeter region 66 of flexible material 54 between the retention ring 62 and an interior of cap 58. For example, retention ring 62 may be formed with a shoulder 76 which is moved toward a corresponding shoulder 78 within cap 58 to sufficiently compress the flexible material 54 for creation of an improved seal.

Figure 6:
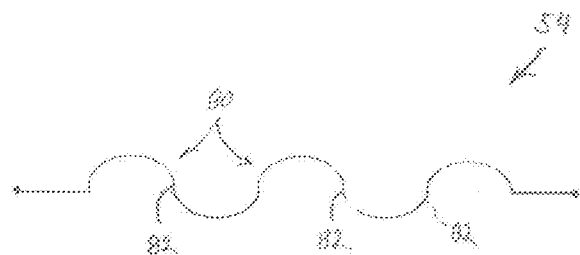
FIG. 6 is a schematic representation of another example of the flexible layer of material, according to an alternate embodiment of the present invention.

The flexible layer of material 54 may be constructed in a variety of sizes, forms and materials which move easily to compensate for liquid volume changes while creating very little force, thus preventing establishment of a detrimental pressure differential between the protective fluid/oil 48 and the external drilling fluid. By way of example, the flexible layer of material 54 may be a sheet of resilient material 72, e.g. a sheet of rubber material, but the flexible layer of material also may comprise other configurations. As illustrated in FIG. 6, for example, the flexible layer of material 54 may be formed as a wavy sheet 80 having a plurality of waves 82 which facilitate expansion of the volume of oil/protective fluid 48 without applying a detrimental force. The wavy sheet 80 may be formed of a resilient material, such as a rubber material.

Figure 7:
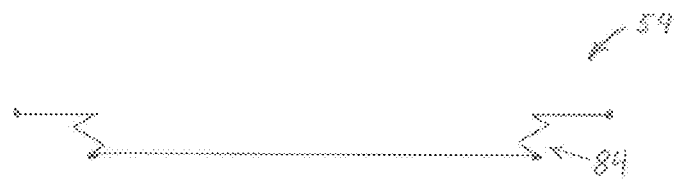
FIG. 7 is a schematic representation of another example of the flexible layer of material, according to an alternate embodiment of the present invention.
Figure 8:
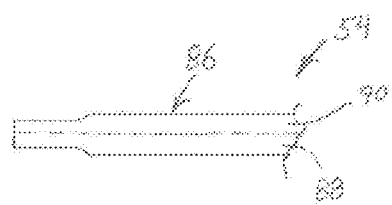
FIG. 8 is a schematic representation of another example of the flexible layer of material, according to an alternate embodiment of the present invention.

In another embodiment, the flexible layer of material 54 comprises a bellows 84, as illustrated in FIG. 7. The bellows 84 is similarly designed to facilitate expansion of the volume of oil/protective fluid 48 without applying a detrimental force. The bellows 84 may be formed from rubber or other resilient materials, composite materials, or even stiffer materials, e.g. metal materials, joined at flexible bends or hinges. The flexible layer of material 54 also may be formed as a composite structure 86, such as the composite structure illustrated in FIG. 8. For example, the flexible layer of material 54 may be formed as a lamination of different materials 88, 90 to form structure 86. This allows selection of different materials suited for the particular fluid in contact with the specific material. In one embodiment, the inner laminate/layer of material 88 is selected to be oil resistant while the outer laminate/layer of material 90 is selected to be drilling fluid resistant.

In the embodiments described herein, the flexible material 54 and the overall compensation system 24 may have various structures and sizes to facilitate accurate measurement via one or more strain gauges 22. In some applications, multiple compensation systems 24 may be used in cooperation with multiple strain gauges 22 positioned along a drilling system or other type of system to obtain strain data which is transmitted to data system 26. The materials selected and the thickness of the material may vary according to the environment and application in which the strain gauges 22 are employed. In some applications, the flexible material 54 may be selected to exert less than 10 psi when fully extended while being functional through a pressure range from 0 to 20,000 psig. However, this is merely an example, and a variety of flexible layers of material 54 may be employed to accommodate expansion of the protective fluid 48 without exerting detrimental force, thus enabling collection of more accurate data from the strain gauges.

Although only a few embodiments of the present invention have been described in detail above, those of ordinary skill in the art will readily appreciate that many modifications are possible without materially departing from the teachings of this invention. Accordingly, such modifications are intended to be included within the scope of this invention as defined in the claims.

What is claimed is:

1. A system for measuring strain while drilling a wellbore, comprising:
    a drill string having a drilling component;
    a strain gauge mounted to the drilling component; and
    a compensation system enclosing the strain gauge, the compensation system comprising:
        a cap mounted to the drilling component to form a cavity, the cap having an outer opening exposed to a drilling mud flow path;
        a volume of protective liquid disposed in the cavity to cover the strain gauge; and
        a flexible layer of material disposed within the cap and enclosing the volume of protective liquid to compensate for protective liquid volume changes without creating a detrimental pressure differential between the volume of protective liquid and the drilling mud,
    wherein the compensation system further comprises a retention ring positioned to squeeze an outer region of the flexible layer between the retention ring and the cap.

2. The system is recited in claim 1, wherein the flexible layer of material comprises a resilient sheet and the protective liquid comprises oil.

3. The system is recited in claim 1, wherein the flexible layer of material comprises a sheet of rubber material.

4. The system is recited in claim 1, wherein the flexible layer of material comprises a wavy sheet.

5. The system as recited in claim 1, wherein the flexible layer of material comprises a wavy sheet of resilient material.

6. A system for measuring strain while drilling a wellbore, comprising:
    a drill string having a drilling component;
    a strain gauge mounted to the drilling component; and
    a compensation system enclosing the strain gauge, the compensation system comprising:
        a cap mounted to the drilling component to form a cavity, the cap having an outer opening exposed to a drilling mud flow path;
        a volume of protective liquid disposed in the cavity to cover the strain gauge; and
        a flexible layer of material disposed within the cap and enclosing the volume of protective liquid to compensate for protective liquid volume changes without creating a detrimental pressure differential between the volume of protective liquid and the drilling mud,
    wherein the flexible layer of material comprises a bellows.

7. A method of measuring strain, comprising:
    mounting a strain gauge on a drilling component of a drill string;
    covering the strain gauge with a volume of oil;
    containing the volume of oil with a flexible layer of material, the flexible layer of material being sufficiently flexible to provide a negligible pressure differential between the volume of oil and the surrounding environment while drilling; and
    exposing the flexible layer of material to drilling fluid on a surface of the flexible layer of material opposite the volume of oil.

8. The method as recited in claim 7, further comprising protecting the layer of flexible material with a cap having an aperture through which the layer of flexible material is exposed to the drilling fluid.

9. The method as recited in claim 8, further comprising gripping a perimeter region of the layer of flexible material with a retention ring.

10. The method as recited in claim 9, wherein gripping comprises squeezing the perimeter region between the retention ring and the cap to form a secure seal.

11. The method as recited in claim 7, wherein containing the volume of oil with a flexible layer of material comprises containing the volume of oil with a composite structure formed as a lamination of dissimilar materials.

12. The method as recited in claim 7, wherein containing the volume of oil with a flexible layer of material comprises containing the volume of oil with a wavy sheet.

13. A method of measuring strain, comprising:
    mounting a strain gauge on a drilling component of a drill string;
    covering the strain gauge with a volume of oil; and
    containing the volume of oil with a flexible layer of material, the flexible layer of material being sufficiently flexible to provide a negligible pressure differential between the volume of oil and the surrounding environment while drilling
    wherein containing the volume of oil with a flexible layer of material comprises containing the volume of oil with a bellows.

14. A method of protecting a strain gauge, comprising:
    mounting a strain gauge on a component potentially subjected to strain;
    covering the strain gauge in a volume of protective liquid; and enclosing the volume of protective liquid, wherein enclosing comprises placing a resilient, flexible material between the volume of protective liquid and an external environment, wherein covering comprises filling a cavity containing the strain gauge with the protective liquid in the form of an oil, and wherein enclosing comprises
securing a cap with an aperture over the cavity; and
trapping the resilient, flexible material beneath the cap.

15. The method as recited in claim 14, wherein mounting comprises mounting the strain gauge to a downhole drilling component.

16. The method as recited in claim 14, wherein placing comprises placing a thin sheet of rubber material between the volume of protective liquid and a drilling fluid.

* * * * *